3,005,743
METHOD FOR JOINING WOOD ARTICLES WITH RESINOUS COAL ACIDS ADHESIVES

James B. Louch, Coleman, and Wesley L. Archer, Midland, Mich., assignors to The Dow Chemical Company, Midland, Mich., a corporation of Delaware
No Drawing. Filed Aug. 9, 1957, Ser. No. 677,407
11 Claims. (Cl. 156—331)

The principal aim and major concern of the present invention is to provide an improved method, offering and achieving pronounced benefit and significant advantage, for joining, binding or laminating wood and the like particles in various forms, including sheets, boards and the like and chips, fibers or other particles or forms thereof, as well as similar fibrous materials, using in the practice of said method utile adhesive compositions that are comprised of particular admixtures of the various reaction products or adducts of coal acids with alcamines, polyamines or polyhydroxy compounds.

According to the present invention, wooden and the like articles may advantageously be joined and adhesively bound together by a method which comprises and entails the essential steps of (1) preparing a liquid dispersion (as an aqueous solution or suspension) of a cross-linkable, thermosetting, resin-providing composition consisting of equivalent weight proportions not in excess of about 2:1 of either ingredient of (a) a mixture of the polycarboxylic acids that may be obtained from the oxidation of coal and the like carbonaceous substances, which for convenience, are herein referred to as coal acids and (b) a polyfunctional (advantageously difunctional) compound which is selected from the group consisting of alcamines (which, desirably, may be alkanolamines) polyamines, polyhydroxy compounds and their mixtures; (2) uniformly adding to and incorporating in said liquid dispersion a lesser proportion, preferably in excess of about 5 percent by weight, based on the total combined weight of the resinous and resin-providing solids in the resulting mixture, of a solid additive in a finely divided and particulate physical form that consists of a thermoset, cured and highly cross-linked coal acids resin derived from (c) said coal acids and (d) polyfunctional compounds or mixtures thereof of the above-indicated type; (3) applying the resulting adhesive admixture to the surface of at least one of the wooden or other like articles to be joined (or handling or otherwise using said admixture in a conventional manner as a binder for the wooden or other like articles to be bound, glued, laminated or otherwise joined); (4) physically associating or joining the wooden articles to be bound in the presence of said applied adhesive admixture (advantageously under the compressive influence or effect of an applied pressure on the wooden or equivalent structures or particles intended to be joined or coalesced); and (5) subjecting said joined articles in the presence of said applied admixture to the influence of heat at an elevated thermosetting and curing temperature for the liquid dispersion of said cross-linkable, thermosetting, resin-providing coal acids/polyfunctional compound composition in said liquid dispersion to cause said resin-providing composition to cross-link and thermoset and drive off all or substantially all of the liquid vehicle in which said admixture is dispersed for application over said surface.

It may often be found advantageous for the adhesive composition or admixture that is utilized in the practice of the present invention to contain between about 5 and 50 percent (and; more advantageously, less than about 25 or so percent) by weight, based on the weight of the total resinous and resin-providing solids in the admixture, of the finely divided, cross-linked, thermoset and cured coal acid resin additive. Frequently the adhesive admixtures that are utilized may be prepared with maximum benefit when using water as the dispersing liquid. Regardless of the particular liquid vehicle that is employed, however, the adhesive admixture may have any desired consistency that may be best adapted to meet the intended mode of utilization, taking into account the particular wooden or other like articles being joined or bonded together. In connection with this, it may oftentimes be preferred for many purposes to utilize the adhesive admixture as a relatively thick liquid or paste-like mass having a solids content of at least about 50 to 70 or 80 percent by weight, or more, based on the total weight of liquid-dispersed composition. The adhesive admixtures that are employed in the practice of the invention are not only relatively inexpensive materials but have an excellent, practically indefinite pot life.

Composite products from wood and the like articles that may be glued, joined or laminated by practice of the present invention (such as laminated plywood from sheets and veneers; panels; particle boards and the like from chips and other filler compositions; paper-like products from short hardwood fibers or various natural and synthetic fibers or any desired mixtures of such fibrous materials, etc.) have suitable initial strength as composite structures, good heat resistance, excellent cold-soak wet strength, and exceedingly good retention of their strength even after being subjected to boiling water for considerable periods. Utilization of the particulate, cross-linked, resinous additive in the adhesive admixtures possibilitates that realization of maximum bonding efficacy from the cross-linkable component in the admixture so as to secure the indicated desiderations for the structures being manufactured. This is believed to stem from the ability of the additive to minimize and control loss of the adhesive during the initial heating stages in the thermosetting and curing cycle. In the practice of the method of the present invention, conventional quantities of the liquid dispersed adhesive admixture may be utilized for joining or binding wood and the like in any particular application. Composite structures of wood and similar other products that have been prepared according to the present invention are at least commensurate, if not superior, in this regard to many of the usual adhesive materials, such as urea-formaldehyde compositions, that have heretofore been available and which frequently are employed for such purposes.

In preparing composite wood or other structures in the practice of the present invention, the permanent desired joinder with the liquid-dispersed adhesive admixture (containing and comprised of the cross-linkable, thermosetting, resin-providing coal acids/polyfunctional compound composition to which there is added the finely divided, cross-linked, thermoset and cured resin additive that has been prepared from similar components or starting materials) is achieved and effected, as has been mentioned, under the influence of heat at an elevated thermosetting and curing temperature for the cross-linkable, polyfunctional compounds/coal acids composition. Such thermosetting and curing heat is applied for a sufficient period of time to permit the resin-providing coal acids/polyfunctional compound adhesive composition to be thoroughly cured in situ while in intimate, binding contact with the wood or other filler or article that is being joined or bonded. Advantageously, as mentioned, the adhesive composition is joined and set to bind composite structures under the compressive effect of an applied pressure on the wood or equivalent structures or particles being joined or coalesced during the thermosetting or curing of the thermosettable, resin-providing component in the adhesive admixture. The pressure that is utilized need only be sufficient to ensure an intimate contact between the bonding surfaces. Of course, relatively high pressures, such as may be developed by, under, or with the assistance of platens, rams and other pressing apparatus may also be employed. Thus the pressure that is effected to compact the material being joined during the setting of the adhesive admixture may be between about 15 or less and and 200 or more pounds per square inch, depending upon whatever conditions may be best suited in the practice that may be more desirable or favored when manufacturing various composite articles and structures.

The applied adhesive admixture that is used in the practice of the present invention can, as a general rule, be satisfactorily thermoset and cured to provide a suitable binder by heating it to an actual resin temperature between about 300° F. and 600° F., preferably at least about 360° F., for a period of time between about 10 seconds and 10 minutes, using heat that is derived from a hot platen or equivalent heat-providing source for such purpose. Besides such more conventional heating means for setting the adhesive admixture in the practice of the present invention, dielectrical heating may also be utilized. It may frequently be found necessary to employ a temperature from a heat-exchanging means of at least about 400° F. in order to completely thermoset and cure the adhesive admixture. While this temperature is somewhat above the temperatures at which cellulose is usually considered to commence carmelization, the conditions under which the adhesive admixture is usually employed as a binding component for wood generally results, at worst, in no more than mere changes in the appearance of the wood without occasioning or engendering noticeable deleterious influences upon its essential structural properties and characteristics. Frequently not even this sort of change in appearance is incurred.

The precise period of time that the curing heat need be applied depends to a great extent, as will be appreciated by those having the skill of their calling, upon the configuration and particular constitution of the structure being joined or bound together as well as upon the heating conditions that are utilized and the heat-transferring or exchanging efficiencies that may be involved. Care should be taken in all instances to avoid such extremes of temperature alone, or time and temperature combined, that may cause either the wood product or the adhesive admixture to degrade, decompose, burn or char so as to change its essential physical properties.

The cross-linkable, resin-providing compositions that are employed may be mere physical mixtures of the indicated reactant components that are utilized for their preparation or they may be partially reacted coal acid adducts with the particular polyfunctional constituent that being employed. When alcamine or polyamine compounds are used with the coal acids, it is generally an advantage to furnish the resin-providing compositions in the form of partially reacted adducts that are capable, upon exposure to heat at elevated, cross-linked temperatures, of forming thermoset resinous materials of an internally cross-linked or cured nature. While adducts may also be prepared from coal acids and polyhydroxy compounds, it may sometimes be expedient to utilize such resin-providing compositions in the form of mere physical mixtures in order to provide the thermosetting, resin-providing constituents of the adhesive admixtures that are used in practice of the present invention. In order to obtain maximum cross-linking and self-interresting potential in the resin-providing compositions (whether in the form of mere physical mixtures or as adducts), it is generally preferred or at least most desirable to utilize about equal equivalent weight proportions of the reactant ingredients therein. In this connection, the resin-providing compositions that are used in the adhesive admixtures in the practice of the present invention are similar or identical with those which are disclosed and described in the copending applications for United States Letters Patents having Serial Numbers 629,569; 629,668, and 629,669 (now U.S. 2,895,934; 2,895,935; and 2,895,936, respectively) which were simultaneously filed by one of the present inventors with others on December 20, 1956.

Thus, cross-linkable coal acids adducts from alcamines or polyamines may generally be prepared in a suitable solvent medium, such as in water or low molecular weight aliphatic alcohols, including methanol and ethanol, or even in surplus quantities of the polyfunctional alcamine or polyamine compound when it is available as a liquid having suitable fugacity to allow for its ready removal from the reaction mass at the desired termination point for the adduct-forming reaction. The reaction between coal acids and alcamines or polyamines may generally be conducted at normal room temperatures. It is usually exothermic in nature. As a consequence, such reactions may frequently require cooling during their course in order to obtain the most desirable varieties of cross-linkable adducts. After their preparation, the coal acid adducts with alcamines and polyamines may be isolated from solution in the reaction mass and recovered, if so desired, as solids having appearances that may vary from crystalline structures to somewhat glassy appearing products. In many instances, however, the alcamine and polyamine adducts with coal acids may be utilized for employment in the adhesive admixtures directly in the solution of the reaction mass in which they were obtained, concentrating it to a preferred concentration if need be for such preparation.

Cross-linkable coal acids adducts with polyhydroxy compounds may be prepared in a manner which is roughly analogous to that which may be utilized for the preparation of the alcamine and polyamine adducts. Certain exceptions, however, are generally observable in reactions involving coal acids and polyhydroxy compounds. For example, the latter reactions usually are not exothermic. For this reason, their satisfactory accomplishment may necessitate heating of the reaction mass at temperatures below those which might drive water therefrom. In addition, the polyhydroxy compound/coal acids adducts are generally less soluble than the corresponding alcamine or polyamine adducts in most of the ordinarily encountered solvents, especially water. Hence, it is oftentimes more expedient and convenient to employ mere resin-providing physical mixtures of the polyhydroxy compounds and coal acids in order to prepare the resin-providing constituents in the adhesive admixtures used in the present invention when it is desired to manufacture the admixtures from such reactants. Of course, satisfactory results can be obtained with even the insoluble thermosetting, resin-providing polyhydroxy compound/coal acids adducts by utilizing them in an emulsified or otherwise dispersed form in the liquid vehicle that is employed in the adhesive admixtures.

Similarly, the solid, highly cross-linked, thermoset and cured, resinous coal acids additives which are employed in finely divided form in the adhesive admixtures used for practice of the present invention may be obtained from the reaction and subsequent complete cross-linking and curing of one aquivalent of coal acids with one or more equivalents of any of the indicated varieties of polyfunctional compounds or their mixtures. The coal acid resin additives that are thereby obtained and utilized may or may not contain terminal hydroxy or amine groups. As a consequence, depending on whether or not such terminal, further reactable groups are present in their structures, the cross-linked coal acids resin additives may or may not enter into further reaction with the cross-linkable, resin-providing compositions that provide the basic adhesive effect for the admixtures which are used as binders or glues in the practice of the present invention.

It is generally desirable for the highly cross-linked, resinous coal acids additives that are utilized for the adhesive admixtures of the present invention to be as finely divided as possible. To this end, it is advantageous for the major bulk of the resinous additive, preferably all of it, to be comprised of particles that have an average size finer than about 150 mesh, and, more advantageously, finer than about 200 mesh, in the U.S. Standard Sieve Series. Most of the thermoset, cured and cross-linked coal acid resins which may be utilized as additives for the adhesive admixture compositions in the practice of the present invention are quite readily susceptible to being physically reduced in size or comminuted to the desired finely divided, particulate form by means of conventional grinding or milling techniques. Certain of the cross-linked resins, however, may not be sufficiently hard and friable to permit their effective physical reduction to the desired particle size when using ball mills and the like communiting apparatus. In such cases, other methods of comminution may be resorted to, including utilization of devices that are adapted to powder the resins by virtue of shearing or the like size reducing effects.

The coal acids that are employed to prepare both the thermosetting, cross-linkable, resin-providing compositions and the thermoset, cured and highly cross-linked additives that are combined in the adhesive admixtures which are used with such salient advantage in the practice of the present invention may be identical with or similar to those which may be obtained by the oxidation with gaseous oxygen, which may be contained in air, of an aqueous, alkaline slurry of a finely divided carbonaceous material selected from the group consisting of coal and coke that has been obtained by the carbonization of coal at temperatures beneath about 1300° F. Coal acids that have been prepared by the nitric acid oxidation of suitable carbonaceous materials are also generally satisfactory. Equivalent synthetic mixtures of such essentially polycarboxylic aromatic acids may also be used. Such coals that are of the varieties known as anthracite, bituminous, sub-bituminous and lignite and other low grade coals are generally suitable for production of coal acids. Satisfactory cokes are those produced according to conventional techniques from coal at a temperature beneath about 1300° F. The utilization of higher coking temperatures frequently causes the cokes that are obtained to be graphitic and rendered unsuitable for conversion to coal acids in satisfactory yields.

The free coal acids product is a hygroscopic, usually yellowish, essentially water-soluble material that is believed, as has been indicated, to be substantially comprised of various aromatic polycarboxylic acids. The average molecular weight of the coal acids that are ordinarily obtained is frequently in the neighborhood of 250–270 or so. Their average molecular weight (as may be determined in boiling point evaluation tests) is generally greater than about 200. Usually, however, it is not in excess of about 300. The average apparent equivalent weight of the free coal acids is generally about 80; seldom being less than about 70 or more than about 90. The free coal acids ordinarily appear to have an average of about 2.5 to 5 carboxylic groups per molecule with an apparent average of 3 to 4 being common. While their exact chemical nature and constitution may be somewhat conjectural, they evidently contain considerable quantities of tri- and tetra-carboxylic benzene acids as well as aromatic acids having more complex nuclei. Frequently, for example, the greatly preponderant proportion of aromatic nuclei obtained in coal acids prepared in the described fashion have been found to consist of methyl naphthalene, benzene, biphenyl, naphthalene, phenathrene, alkyl benzene, benzophenone and toluene nuclei.

The polyfunctional amine compounds that may be employed for the preparations of both certain of the resin-providing compositions and certain of the additives used for the adhesive admixtures in the practice of the invention may advantageously be selected from the group of polyamines that are represented by either of the formulae $H_2N-R-NH_2$ and $H_2N-(R-NH-R)_n-NH_2$ wherein R may be any $C_2$ to $C_{10}$ aliphatic or $C_6$ to $C_{14}$ aromatic radical and $n$ is a whole integer. Other functionally equivalent polyamine compounds such as piperazine, the various substituted piperazines and melamine, in which the nitrogen atoms are part of a heterocyclic molecular structure, may also be utilized. In the interests of economy, it is generally an advantage to utilize relatively low molecular weight aliphatic polyamines for the preparation of the coal acids adducts. Polyamines that may be included in this category include hexamethylenediamine, hexamethylenetetramine, ethylenediamine, diethylenetriamine, triethylenetetramine and the like.

The alcamine compounds which may be employed in the practice of the invention for both varieties of coal acids-containing constituents in the adhesive admixtures may be any aliphatic or alicyclic alkanolamine (which may also have aromatic nuclei in its molecular arrangement) that contains at least one amine group (preferably a secondary amine group) and at least one hydroxyl group in its molecule. Beneficially, the alcamine compounds that are utilized are selected from the group of such compounds that are represented by either of the formulae:

$H_2N-G-OH$; $HO-G-NH-G-OH$; $(HOG)_3N$ and the like and analogous structures wherein each G may independently be any $C_2$ to $C_{12}$ aliphatic radical. Other functionally equivalent polyfunctional alcamine compounds may also be utilized. As is the case when polyamine reactants are used, it is generally an advantage to meploy relatively low molecular weight aliphatic alcamines or polyglycol polyamines for the preparation of the resinous coating compositions. Alcamines that may be particularly included in this category include mono-, di- and tri-ethanolamine and mixtures thereof, propanolamine, butanolamine and the like monoamine and polyamine alkanolamine compounds containing one or more reactive hydroxyl groups.

The polyfunctional polyhydroxy compounds which may be employed for the indicated purposes may be any aliphatic or alicyclic polyhydric alcohol including such compounds as pentaerythritol, the carbohydrates and related anologs. It is also an advantage in the practice of the invention to utilize the ordinarily available polyhydroxy compounds. Polyfunctional polyhydroxy compounds that may be included in this category include ethylene and diethylene glycols, propylene and dipropylene glycols, sorbitol, mannitol, glycerol and various water-soluble alkylene oxide condensates and derivatives. While it is usually beneficial for a water-soluble polyhydroxy compound to be employed, there is no requirement to do so for either the resin-providing constituents or the additives in the adhesive admixtures in order to realize a satisfactory practice of the invention.

A particularly advantageous adhesive composition or admixture for use in the practice of the present invention is comprised of a resin-providing, thermosetting water solution of coal acids and diethanolamine or other low molecular weight water soluble alkanolamine containing between about 50 and 80 percent by weight of dissolved resin-providing solids (which may actually be in the form of a salt or resin-providing adduct) containing uniformly dispersed therein between about 5 and 25 percent by weight of a finely divided cross-linked thermoset and cured coal acids resin of either ethylene gylcol or glycerine or their admixtures having an average particle size not greater than about 200 mesh.

By way of further illustration, a cross-linked thermoset and cured coal acids resin additive was prepared by charging into a suitable reaction flask about 323 grams (4 equivalents) of free coal acids; 1104 grams (12 moles) of glycerine; 50 grams of xylene (which was added to furnish the basis for an azotropic mixture to facilitate isolation of the resulting resinous product); and 4 milliliters of 95.5–96.5 percent concentrated sulfuric acid (having a specific gravity of about 1.84) which was used as a catalyst for the esterification. The coal acids that were employed had an average molecular weight of about 284, an average apparent equivalent weight of about 84.6, an average functionality (or number of carboxylic acid groups per molecule) of about 3.36, and a carbon-to-hydrogen ratio of about 1.46; being comprised of 54.36 percent by weight of carbon; 3.10 percent hydrogen, 0.52 percent nitrogen and 0.16 percent sulfur. The mixture was caused to react throughout a 3½ hour period at a temperature between about 257 and 296° F. During the reaction, the maximum overhead temperature over the reaction flask while the xylene-water azeotrope was evolving was between about 230 and 236° F. About 128 ml. of overheads were collected during the reaction. After termination of the reaction, the unreacted materials were removed by vacuum distillation. About 700 grams of a glassy-appearing, highly cross-linked, thermoset product was thereby obtained in about theoretical yield. The product was vacuum dried at a temperature between 212 and 284° F.

The cross-linked resin product was ball milled until it had an average particle size finer than about 200 mesh. It was then directly employed as an additive for several adhesive admixtures that were formulated and used for practice of the invention.

About 10 percent by weight of the powdered additive (based on the total resin and resin-providing solids of the resulting admixture) was added to a 70 percent dissolved solids content solution which contained a quantity of the above-described free coal acids and another quantity of diethanolamine in about equal equivalent weight proportions of each resin-providing ingredient. The powdered additive was thoroughly dispersed in the aqueous solution until a smooth pasty mass resulted. Three-ply yellow birch panels from rotary cut veneer sections having individual dimensions of about 1/16 x 6 x 6 inches were then prepared (with brush application of a single coat of the adhesive composition per single glue line of the veneer with an average covering of from about 15 to 30 pounds of the adhesive per thousand square feet of glue line) by pressing the laminate assembly together under about 120 pounds per square inch of pressure while subjecting it for a period of about 10 minutes in a press (including 2 minutes preheat time in the closed press before the pressure was applied) to heat from a platen that was at a temperature of about 380° F. The prepared panels were then cut into plywood strip shear test specimens and, after being conditioned, were tested in accordance with ASTM specifications D906–49 for dry shear strength and D1151–51T for water soak (both cold and boiling) tests. Accordingly, some of the specimens were broken dry, and found to have an average dry shear strength of about 260 to 305 pounds per square inch. Some of the specimens were then subjected to a 48 hour cold soak in water and found to have an average wet shear strength of a magnitude of from about 115 to 120 percent of their dry strength. Some of the specimens were subjected to boiling and found to be capable of withstanding an average of 40 to 80 minutes of immersion before delamination.

When the foregoing was repeated in an identical manner, excepting to prepare the cross-linked additive from the coal acids and 12 moles of ethylene glycol (in place of the glycerine) and to accomplish the esterification without the acid catalyst, the resulting specimens obtained from an adhesive admixture prepared in an identical manner with the highly cross-linked coal acids/ethylene glycol resin additive were found to have an average dry shear strength of about 215 pounds per square inch, an average wet shear strength of about 162 percent of their dry strength, and to be capable of withstanding boiling water for one hour before delamination.

By way of contrast with the above results, when the 70 percent cross-linkable resin-providing solution of coal acids and diethanolamine was used independently for joining the panels without dispersing the finely divided, cross-linked resin additive therein, the resulting structures, although having commensurate dry shear strengths, had wet shear strengths after being cold soaked that were, at best, only about two-thirds as good as those of the structures prepared in accordance with the invention. The structures bonded without the use of the additive in the adhesive resin-providing composition also showed decidedly inferior performance in the boiling water tests compared to that of structures joined by practice of the invention.

Highly satisfactory results may also be obtained when the method of the present invention is practiced by using other of the adhesive admixtures indicated as being within its scope.

What is claimed is:

1. Method for joining and adhesively binding together articles consisting essentially of wood fiber, which method comprises the steps of (1) preparing a dispersion in a liquid vehicle of a cross-linkable thermosetting resin-providing compositon consisting of equivalent weight proportions not in excess of about 2:1 of either ingredient of (a) coal acids that are the water-soluble mixed aromatic polycarboxylic acids product of the oxidation of coal, which acids typically have an average molecular weight of from 200 to 300, an apparent average equivalent weight of from 70 to 90, and contain an average of from 2.5 to 5 carboxylic groups per aromatic nucleus in their molecule and (b) a polyfunctional organic compound selected from the group consisting of alcamines, polyamines whose polyfunctionality is derived from a plurality of active amine components thereof, organic polyhydroxy compounds whose polyfunctionality is derived from a plurality of hydroxy substituents thereon and their mixtures, (2) uniformly adding to and incorporating in said liquid dispersion a lesser proportion that is in excess of about 5 percent by weight, based on the total combined weight of the resinous and resin-providing solids in the resulting mixture, of a finely divided, particulate, solid additive that consists of a thermoset, cured and highly cross-linked coal acids resin derived from (c) said coal acids and (d) a polyfunctional compound selected from the above-indicated group; (3) applying the resulting adhesive admixture to the surface of at least one of the articles to be joined; (4) physically associating the articles to be joined and bound by bringing said articles together at surfaces thereof over which said adhesive admixture has been applied; and (5) subjecting said joined articles in the presence of said applied admixture to the influence of heat at a temperature between about 300 and 600° F. until said liquid dispersed, resin-providing, coal acids polyfunctional compound composition has been thermoset and cured and substantially all of the liquid vehicle for said admixture has been removed.

2. The method of claim 1, wherein between about 5 and 50 percent by weight of said cross-linked additive is incorporated in said liquid dispersion to provide said adhesive admixture, said percentage of additive being based on the total combined weight of the resinous and resin-providing solids in said adhesive admixture.

3. The method of claim 1, wherein between about 5 and 25 percent by weight of said cross-linked additive is incorporated in said liquid dispersion to provide said adhesive admixture, said percentage of additive being based on the total combined weight of the resinous and resin-providing solids in said adhesive admixture.

4. The method of claim 1, wherein said adhesive admixture is prepared to have a total solids content of from about 50 to 80 percent by weight, based on the total weight of the liquid dispersed composition.

5. The method of claim 1, wherein said joined articles are subject to the influence of said thermosetting and cured heat at a temperature in excess of about 360° F. until said resin-providing composition has been thermoset and cured.

6. The method of claim 1, wherein said cross-linkable, thermosetting, resin-providing composition consists of said coal acids and a low molecular weight, aliphatic alkanolamine which contains from 2 to 12 carbon atoms in its molecule.

7. The method of claim 1, wherein said finely divided additive consists of a thermoset and highly cross-linked coal acids resin derived from said coal acids and a polyfunctional polyhydroxy compound.

8. The method of claim 1, wherein said finely divided additive consists of a thermoset and highly cross-linked coal acids resin derived from said coal acids and glycerine.

9. The method of claim 1, wherein said finely divided additive consists of a thermoset and highly cross-linked coal acids resin derived from said coal acids and an ethylene glycol.

10. The method of claim 1, wherein said finely divided, particular, solid additive consists of particles having an average size that is finer than about 150 mesh in the U.S. Standard Sieve Series.

11. The method of claim 1 wherein the articles are wood.

References Cited in the file of this patent

UNITED STATES PATENTS

| | | |
|---|---|---|
| 2,068,759 | Nevin | Jan. 26, 1937 |
| 2,149,286 | Graves | Mar. 7, 1939 |
| 2,339,237 | Brubaker et al. | Jan. 18, 1944 |
| 2,440,516 | Kropa | Apr. 27, 1948 |
| 2,542,288 | Pickens | Feb. 20, 1951 |
| 2,824,848 | Wittcoff | Feb. 25, 1958 |
| 2,895,934 | Archer et al. | July 21, 1959 |
| 2,895,936 | Archer et al. | July 21, 1959 |